United States Patent [19]

Sagara

[11] Patent Number: 4,732,875

[45] Date of Patent: Mar. 22, 1988

[54] OPTICAL GLASS

[75] Inventor: Koji Sagara, Tokyo, Japan

[73] Assignee: Hoya Corporation, Tokyo, Japan

[21] Appl. No.: 832,265

[22] Filed: Feb. 21, 1986

[30] Foreign Application Priority Data

Feb. 22, 1985 [JP] Japan .................................. 60-32560

[51] Int. Cl.$^4$ .......................... C03C 3/253; C03C 3/15
[52] U.S. Cl. ......................................... 501/42; 501/49;
501/50; 501/51; 501/52; 501/74; 501/78;
501/41; 501/900
[58] Field of Search ....................... 501/41, 42, 49–52,
501/901, 74, 78

[56] References Cited

U.S. PATENT DOCUMENTS

| | | | |
|---|---|---|---|
| 3,690,908 | 9/1972 | Greco et al. | 501/41 |
| 3,826,661 | 7/1974 | Greco et al. | 501/74 |
| 3,883,357 | 5/1975 | Cooley | 501/41 |
| 3,914,129 | 10/1975 | Wylot | 501/42 |

Primary Examiner—Steven Capella
Attorney, Agent, or Firm—Roberts, Spiecens & Cohen

[57] ABSTRACT

To tellurite optical glass comprising $TeO_2$, high valence components are added and may be a combination of $La_2O_3$, at least one of $B_2O_3$ and $GeO_2$, and at least one of $Ta_2O_5$ and $Nb_2O_5$. The high valence components may include $Y_2O_3$, $Gd_2O_3$, and $Yb_2O_3$. Amounts of $TeO_2$ and $La_2O_3$ are restricted to ranges between 10% and 80% and between 5% and 35%, respectively. A sum of $B_2O_3$ and $GeO_2$ must fall within a range between 1% and 30%, with an amount of $GeO_2$ restricted between 0% and 22%. A total of $La_2O_3$, $Y_2O_3$, $Gd_2O_3$, and $Yb_2O_3$ must be between 5% and 50%. A sum of $Ta_2O_5$ and $Nb_2O_5$ should range from 1% to 26%, with individual amounts of $Ta_2O_5$ and $Nb_2O_5$ kept between 0% and 20% and between 0% and 26%, respectively.

9 Claims, 1 Drawing Figure

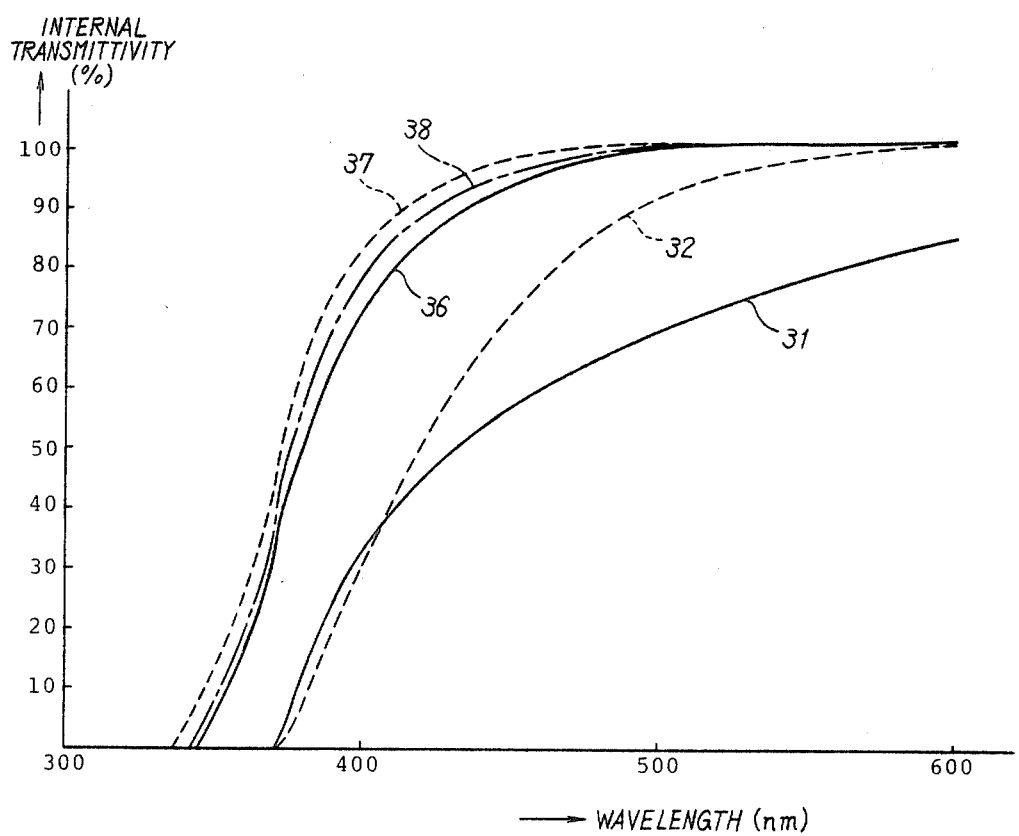

OPTICAL GLASS

BACKGROUND OF THE INVENTION

This invention relates to optical glass for use in an optical apparatus, such as a camera, a telescope, a microscope, a copy machine, a laser device, and the like.

In general, optical glass has a refractive index $n_d$ and a dispersion which are adjusted to a desired optical system in optical apparatus, where the refractive index is determined for the d line of 587.6 nm and the dispersion is defined by an Abbe number $\nu_d$ for the d line. According to this invention, optical glass has a refractive index $n_d$ between 1.8 and 2.2 and an Abbe number $\nu_d$ between 18 and 42.

Heretofore, conventional optical glass or glass composition has been proposed by K. Ishibashi et al in Japanese Patent Publication No. Syô 53-42,330 (42,330/1978) and has been published by M. Faulstich in Glas-Technische Berichte, Volume 34, page 102. Generally, a comparatively great amount of titanium oxide ($TiO_2$) is added to the proposed optical glass together with lead monoxide (PbO) so as to raise or increase the refractive index. An increase of titanium oxide and lead monoxide undesirably tends to color the optical glass yellow or brown. Such undesirable coloration becomes a bar to optical applications of the optical glass.

In order to avoid undesirable coloration of optical glass with a high refractive index kept unchanged, another optical glass or glass composition is disclosed by I. Masuda et al in Japanese Patent Publication No. Syô 52-28,454 (28,454/1977). The disclosed optical glass comprises, by weight, 60–75% of tellurium dioxide ($TeO_2$), 5–20% of zinc oxide (ZnO), and 5–20% of a sum of sodium oxide ($Na_2O$) and lithium oxide ($Li_2O$) and may be called tellurite glass. However, it has been found out that such tellurite glass is too low for optical glass in hardness and encounters difficulty of grinding or polishing. Inasmuch as polishing of optical glass is indispensable for manufacturing an optical lens or the like, the tellurite glass has not been applied to optical use at present.

SUMMARY OF THE INVENTION

It is an object of this invention to provide optical glass which is capable of being readily polished in the usual manner.

It is another object of this invention to provide optical glass of the type described, which has a desired hardness for polishing.

It is still another object of this invention to provide optical glass of the type described, which has a high internal transmittance with a high refractive index within a desirable range.

According to this invention, optical glass comprises, by weight, 10–80% of $TeO_2$, 0–30% of $B_2O_3$, 0–22% of $GeO_2$, 5–35% of $La_2O_3$, 0–18% of $Y_2O_3$, 0–25% of $Gd_2O_3$, 0–15% of $Yb_2O_3$, 0–20% of $Ta_2O_5$, and 0–26% of $Nb_2O_5$. A first sum of $B_2O_3$ and $GeO_2$, a second sum of $La_2O_3$, $Y_2O_3$, $Gd_2O_3$, and $Yb_2O_3$, and a third sum of $Ta_2O_5$ and $Nb_2O_5$ are between 1% and 30%, between 5% and 50%, and between 1% and 26%, respectively.

BRIEF DESCRIPTION OF THE DRAWING

The sole FIGURE of the drawing is a graphical representation comparing the characteristics of optical glass according to this invention with those of conventional optical glass.

DESCRIPTION OF THE PREFERRED EMBODIMENTS

As known in the art, tellurite glass can provide a high refractive index without coloring components, such as titanium dioxide ($TiO_2$), and lead monoxide (PbO). This is because tellurium oxide ($TeO_2$) itself gives a high refractive index, like $TiO_2$, and PbO. Accordingly, such tellurite glass can diminish the degree of coloration resulting from an excessive addition of the coloring components.

According to the inventor's experimental studies, it has been found out that, in tellurite glass, the hardness of optical glass depends on the total amount of components or constituents of a high valence greater than two. In addition, such tellurite glass may be mixed and melted together with conventional glass of $B_2O_3$ (boron trioxide) glass and $GeO_2$ (germanium dioxide) glass. Anyway, such high valence components may firmly be bonded to the other components, as compared with univalent or bivalent components and therefore serve to increase the hardness.

Specifically, the high valence components may include boron trioxide ($B_2O_3$), lanthanum oxide ($La_2O_3$), tantalum pentoxide ($Ta_2O_5$), and niobium pentoxide ($Nb_2O_5$).

Tables 1a through 1c show first through twenty-sixth samples numbered from 1 to 26 and first through third comparative samples (Table 1c) numbered from 27 to 29.

The first comparative sample 27 comprises a composition similar to that exemplified in Japanese Patent Publication No. 42,330/1978 referred to in the Background section of the instant specification. As shown in Table 1c, the first comparative sample 27 comprises, by weight, 24.72% of $B_2O_3$, 38.56% of $La_2O_3$, 17.81% of $Y_2O_3$, and 18.91% of $TiO_2$. The refractive index $n_d$ and the Abbe number $\nu_d$ of the first comparative sample 27 are equal to 1.9034 and 30.9, respectively.

TABLE 1a

| No. | 1 | 2 | 3 | 4 | 5 | 6 | 7 | 8 | 9 | 10 |
|---|---|---|---|---|---|---|---|---|---|---|
| $TeO_2$ | 46.9 | 28.2 | 11.9 | 12.1 | 28.1 | 73.2 | 59.2 | 32.4 | 32.4 | 32.4 |
| $B_2O_3$ | | 11.9 | 15.6 | 26.4 | 12.0 | 2.0 | 8.6 | 17.1 | 20.6 | 21.1 |
| $GeO_2$ | 18.4 | | | | | | | | | |
| $La_2O_3$ | 19.1 | 18.0 | 29.1 | 30.7 | 9.6 | 18.4 | 20.2 | 18.6 | 22.1 | 26.6 |
| $Y_2O_3$ | | | | | | | | | | |
| $Gd_2O_3$ | | 6.9 | | | | | | | 15.0 | 5.0 |
| $Yb_2O_3$ | | | | | | | | | | |
| $Ta_2O_5$ | | 8.3 | 16.4 | 16.7 | 6.5 | 5.0 | | 3.9 | 3.9 | 3.9 |
| $Nb_2O_5$ | 15.6 | | | | | | 8.2 | | | |
| $ZrO_2$ | | 2.5 | 2.8 | 2.8 | 1.8 | 1.4 | 3.8 | 1.0 | 1.0 | 1.0 |
| $HfO_2$ | | | | | | | | | | |
| ZnO | | 2.5 | 24.2 | 11.3 | | | | | | |

TABLE 1a-continued

| No. | 1 | 2 | 3 | 4 | 5 | 6 | 7 | 8 | 9 | 10 |
|---|---|---|---|---|---|---|---|---|---|---|
| BaO | | | | | | | | 17.5 | | |
| SrO | | | | | | | | | | |
| CaO | | | | | | | | | | 10.0 |
| MgO | | | | | | | | | 5.0 | |
| $Li_2O$ | | 1.5 | | | 0.6 | | | | | |
| $Na_2O$ | | | | | | | | | | |
| $K_2O$ | | | | | | | | 2.0 | | |
| $SiO_2$ | | | | | 8.0 | | | | | |
| $Al_2O_3$ | | | | | 3.0 | | | | | |
| $Sb_2O_3$ | | | | | | | | | | |
| $In_2O_3$ | | | | | | | | | | |
| $Bi_2O_3$ | | | | | | | | | | |
| PbO | | 2.8 | | | 30.4 | | | | | |
| $TiO_2$ | | | | | | | | 7.5 | | |
| $WO_3$ | | 17.4 | | | | | | | | |
| $n_d$ | 2.020 | 1.906 | 1.857 | 1.801 | 1.838 | 2.066 | 1.989 | 1.860 | 1.809 | 1.803 |
| $v_d$ | 22.8 | 28.9 | 36.6 | 40.0 | 28.0 | 21.3 | 23.8 | 28.4 | 36.9 | 37.2 |
| Knoop Hardness ($Kg/cm^2$) | 420 | 480 | 620 | 630 | 440 | 340 | 410 | 470 | 570 | 530 |

TABLE 1b

| No. | 11 | 12 | 13 | 14 | 15 | 16 | 17 | 18 | 19 | 20 |
|---|---|---|---|---|---|---|---|---|---|---|
| $TeO_2$ | 32.4 | 57.7 | 57.7 | 59.0 | 28.1 | 28.1 | 64.5 | 33.8 | 33.8 | 59.1 |
| $B_2O_3$ | 18.1 | 8.4 | 8.4 | 7.9 | 9.1 | 9.1 | 4.8 | 17.3 | 17.0 | 3.6 |
| $GeO_2$ | | | | | 10.0 | 10.0 | | | | |
| $La_2O_3$ | 24.6 | 19.6 | 9.8 | 14.8 | 21.0 | 21.0 | 13.6 | 29.7 | 16.9 | 17.2 |
| $Y_2O_3$ | | | | | | 10.0 | | | 12.5 | |
| $Gd_2O_3$ | 5.0 | | | | 20.0 | 10.0 | | | | |
| $Yb_2O_3$ | | | | | | | | 11.4 | | |
| $Ta_2O_5$ | 11.3 | | | 5.0 | 7.5 | 7.5 | 3.3 | 4.8 | 3.8 | |
| $Nb_2O_5$ | | 8.0 | 24.1 | | | | | | | 14.1 |
| $ZrO_2$ | 1.1 | | | | 4.3 | 4.3 | 1.0 | 3.0 | 1.0 | |
| $HfO_2$ | | 6.3 | | | | | | | | |
| ZnO | | | | | | | 8.1 | | 15.0 | |
| BaO | | | | | | | | | | |
| SrO | 7.5 | | | | | | | | | |
| CaO | | | | | | | | | | |
| MgO | | | | | | | | | | |
| $Li_2O$ | | | | | | | | | | |
| $Na_2O$ | | | | | | | 4.7 | | | |
| $K_2O$ | | | | | | | | | | |
| $SiO_2$ | | | | | | | | | | |
| $Al_2O_3$ | | | | | | | | | | |
| $Sb_2O_3$ | | | | | | | | | | 6.0 |
| $In_2O_3$ | | | | | | | | | | |
| $Bi_2O_3$ | | | | 13.3 | | | | | | |
| PbO | | | | | | | | | | |
| $TiO_2$ | | | | | | | | | | |
| $WO_3$ | | | | | | | | | | |
| $n_d$ | 1.831 | 1.994 | 2.053 | 2.019 | 1.904 | 1.894 | 1.836 | 1.862 | 1.838 | 2.081 |
| $v_d$ | 34.4 | 23.2 | 19.8 | 19.6 | 33.0 | 33.1 | 37.4 | 33.9 | 34.5 | 20.9 |
| Knoop Hardness ($Kg/cm^2$) | 560 | 400 | 400 | 360 | 600 | 580 | 330 | 560 | 470 | 350 |

TABLE 1c

| No. | 21 | 22 | 23 | 24 | 25 | 26 | 27 | 28 | 29 |
|---|---|---|---|---|---|---|---|---|---|
| $TeO_2$ | 14.0 | 70.7 | 66.3 | 67.6 | 28.1 | 28.1 | | | 80.66 |
| $B_2O_3$ | 17.0 | 2.2 | | 4.0 | 16.0 | 9.1 | 24.72 | | |
| $GeO_2$ | | | 5.9 | | | 10.0 | | | |
| $La_2O_3$ | 23.5 | 6.2 | 18.3 | 18.7 | 27.5 | 21.0 | 38.56 | | 4.71 |
| $Y_2O_3$ | | | | | | | 17.81 | | |
| $Gd_2O_3$ | | | | | 6.9 | 20.0 | | | |
| $Yb_2O_3$ | | | | | | | | | |
| $Ta_2O_5$ | 3.3 | | 7.5 | 7.6 | 14.7 | 7.5 | | | |
| $Nb_2O_5$ | | 3.4 | | | | | | | |
| $ZrO_2$ | 2.4 | | 2.0 | 2.1 | 4.3 | 4.3 | | | |
| $HfO_2$ | | | | | | | | | |
| ZnO | | 2.6 | | | 2.5 | | | | 8.81 |
| BaO | | 4.8 | | | | | | | |
| SrO | | | | | | | | | |
| CaO | | | | | | | | | |
| MgO | | 1.3 | | | | | | | |

TABLE 1c-continued

| No. | 21 | 22 | 23 | 24 | 25 | 26 | 27 | 28 | 29 |
|---|---|---|---|---|---|---|---|---|---|
| $Li_2O$ | | | | | | | | | |
| $Na_2O$ | | | | | | | | 0.4 | 5.82 |
| $K_2O$ | | | | | | | | | |
| $SiO_2$ | | | | | | | | 19.6 | |
| $Al_2O_3$ | 9.8 | | | | | | | | |
| $Sb_2O_3$ | | | | | | | | | |
| $In_2O_3$ | | 8.8 | | | | | | | |
| $Bi_2O_3$ | | | | | | | | | |
| PbO | 30.0 | | | | | | | 80.0 | |
| $TiO_2$ | | | | | | | 18.91 | | |
| $WO_3$ | | | | | | | | | |
| $n_d$ | 1.830 | 2.018 | 2.056 | 2.033 | 1.887 | 1.904 | 1.9034 | 1.926 | 1.978 |
| $v_d$ | 31.5 | 21.6 | 21.9 | 22.5 | 32.9 | 33.0 | 30.9 | 20.8 | 20.7 |
| Knoop Hardness ($Kg/cm^2$) | 480 | 340 | 350 | 360 | 580 | 600 | | | 210 |

The second comparative sample 28 comprises a composition similar to that of SF (Schwer-Flint) glass widely sold in the market. Specifically, the second comparative sample 28 comprises, by weight, 0.4% of $Na_2O$, 19.6% of $SiO_2$, and 80.0% of PbO and has a refractive index $n_d$ of 1.926 and an Abbe number $v_d$ of 20.8, respectively.

The refractive index $n_d$ and the Abbe number $v_d$ of each of the first and second comparative samples 27 and 28 are between 1.80 and 2.20 and between 18 and 40, respectively.

Temporarily referring to the FIGURE of the drawing, a curve 31 shows the internal transmittance versus wavelength characteristic of the first comparative sample 27 while curve 32 shows a similar characteristic of the second comparative sample 28. Measurement of the internal transmittance is carried out with the first and second comparative samples of 10 mm thickness. As readily understood from curves 31 and 32, each of the first and second comparative samples 27 and 28 exhibits a low transmittance in a short wavelength region shorter than 400 nm. This shows that the first and second comparative samples 27 and 28 are colored yellow or brown. Such yellowish or brownish coloration of each comparative sample results from an excessive addition of $TiO_2$ or PbO, as mentioned in the Background section of this specification.

The third comparative sample 29 is similar to glass exemplified in Japanese Patent Publication No. 28,454/1977. The third comparative sample 29 comprises, by weight, 80.66% of $TeO_2$, 4.71% of $La_2O_3$, and 8.81% of ZnO, 5.82% of $Na_2O$ and has a refractive index $n_d$ of 1.978 and an Abbe number $v_d$ of 20.7.

The third comparative sample 29 has a refractive index, Abbe number, and transmittance satisfactory enough for optical glass. However, the hardness of the third comparative sample 29 is as low as 210 kg/cm² when it is represented by Knoop hardness, as shown in Table 1c. Accordingly, it is difficult to grind or polish the third comparative sample.

In Tables 1a through 1c, the first through twenty-six samples 1 to 26 comprise, by weight, 10–80% of tellurium dioxide ($TeO_2$) which serves as the main component and provides a high refractive index between 1.8 and 2.2, both inclusive. When the amount of $TeO_2$ exceeds 80% by weight, a vitreous state or vitrification becomes unstable in manufacturing optical glass and devitrification is liable to occur in the optical glass. On the other hand, the refractive index $n_d$ becomes less than 1.8 when $TeO_2$ present in an amount less than 10%.

In addition to $TeO_2$, the first through twenty-sixth samples 1 to 26 include lanthanum oxide ($La_2O_3$) which falls within a range between 5% and 35%, both inclusive. The lanthanum oxide serves as a part of high valence components as mentioned above for favorably increasing the hardness, on the one hand, and is effective to avoid devitrification on the other hand. More particularly, the amount of the lanthanum oxide must be equal to or greater than 5% and must not exceed 35% in order to prevent the devitrification.

As the other high valence components, at least one of boron trioxide ($B_2O_3$) and germanium dioxide ($GeO_2$) is included in each of the first through twenty-sixth samples 1 to 26 so as to increase the hardness and to keep the vitreous state stable. The sum of $B_2O_3$ and $GeO_2$ should be between 1% and 30%, both inclusive. When the sum of $B_2O_3$ and $GeO_2$ is less than 1%, the hardness becomes insufficient and the vitreous state becomes unstable. On the other hand, the refractive index becomes too low for optical glass when the sum of $B_2O_3$ and $GeO_2$ exceeds 30%. As to $GeO_2$, vitrification is in an unstable state when the amount of $GeO_2$ is greater than 22%.

Additional ones of the high valence components are also included in each of the first through twenty-sixth samples 1 to 26. The additional high valence components may be selected from the group of yttrium oxide ($Y_2O_3$), gadolinium oxide ($Gd_2O_3$), and ytterbium oxide ($Yb_2O_3$). The additional high valence components are also effective to increase the hardness and to heighten the refractive index, as for $La_2O_3$. Accordingly, consideration may be made about the total amount of $La_2O_3$ and the additional high valence components, namely, $Y_2O_3$, $Gd_2O_3$, and $Yb_2O_3$. The total amount of $La_2O_3$, $Y_2O_3$, $Gd_2O_3$, and $Yb_2O_3$ must be equal to or greater than 5% so as to accomplish the desired hardness and refractive index. In addition, vitrification becomes unstable when the total amount of $La_2O_3$, $Y_2O_3$, $Gd_2O_3$, and $Yb_2O_3$ exceeds 50%. Individual amounts of $Y_2O_3$, $Gd_2O_3$, and $Yb_2O_3$ must not exceed 18%, 25%, and 15%, respectively. Otherwise, devitrification is unfavorably liable to occur.

Moreover, the other ones of the high valence components are included in each of the first through twenty-sixth samples 1 to 26 and are selected from the group of tantalum pentoxide ($Ta_2O_5$) and niobium pentoxide ($Nb_2O_5$). The other high valence components serve to increase both the hardness and the refractive index. The hardness and the refractive index are insufficient for optical glass when the sum of $Ta_2O_5$ and $Nb_2O_5$ is less than 1%. When the sum of $Ta_2O_5$ and $Nb_2O_5$ exceeds 26%, vitrification becomes unstable and meltability becomes degraded. Individual amounts of $Ta_2O_5$ and $Nb_2O_5$ must not exceed 20% and 26%, respectively, so as to avoid devitrification.

In addition to the above-mentioned components, any other optical components may be included, as enumerated in Tables 1a to 1c, and may be selected from the group of zirconium dioxide ($ZrO_2$), hafnium oxide ($HfO_2$), zinc oxide (ZnO), barium oxide (BaO), strontium oxide (SrO), calcium oxide (CaO), magnesium oxide (MgO), lithium oxide ($Li_2O$), sodium oxide ($Na_2O$), potassium oxide ($K_2O$), silicon dioxide ($SiO_2$), aluminum oxide ($Al_2O_3$), antimony oxide ($Sb_2O_3$), indium oxide ($In_2O_3$), bismuth oxide ($Bi_2O_3$), lead monoxide (PbO), titanium dioxide ($TiO_2$), and wolfram trioxide ($WO_3$).

Such optional components are added with a view to the improvement of devitrification-proof and solubility, to the adjustment of optical constants, such as the refractive index $n_d$, the Abbe number $\nu_d$, and to a reduction of material cost.

The amounts of the optional components should be restricted to the following ranges. More particularly, zirconium dioxide ($ZrO_2$) and hafnium oxide ($HfO_2$) must not exceed 6% and 10%, respectively. Otherwise, vitrification becomes unstable.

An excessive addition of ZnO, alkaline earth metal oxides (BaO, SrO, CaO, and MgO), alkali metal oxides ($Li_2O$, $Na_2O$, and $K_2O$) gives rise to a reduction of both the refractive index $n_d$ and hardness and to degradation of devitrification-proof under the circumstances, the amount of ZnO must be equal to or less than 30%. The total amount of the alkaline earth metal oxides must not exceed 20%. Likewise, the total of the alkali metal oxides should not exceed 6%. In the alkaline earth metal oxides, BaO, SrO, CaO, and MgO are individually restricted up to 20%, 15%, 15%, and 10% in view of the devitrification-proof property.

In addition, the stability of vitrification and the solubility are degraded when individual amounts of $SiO_2$, $Al_2O_3$, $Sb_2O_3$, and $In_2O_3$ exceed 15%, 12%, 10%, and 10%, respectively.

Furthermore, the amounts of $Bi_2O_3$, PbO, $TiO_2$, and $WO_3$ must not exceed 15%, 35%, 10%, and 25%, respectively. Otherwise, coloration unfavorably occurs in the glass.

A small amount of arsenic oxide ($As_2O_3$), tin oxide ($SnO_2$), and fluoride (F) may be added with a view to refining, defoaming, reducing the degree of coloration, and the like.

Each of the first through twenty-sixth samples is manufactured by mixing raw materials enumerated in Tables 1a to 1c to form mixtures, melting each mixture into a melt in a crucible or pot of platinum or gold at a temperature between 850° C. and 1200° C., uniformly agitating and defoaming the melt, and casting the melt in a preliminarily heated mold to be annealed.

As shown in Tables 1a through 1c, the first through twenty-sixth samples 1 to 26 have refractive indices $n_d$ between 1.80 and 2.2, Abbe numbers $\nu_d$ between 20.0 and 40.0, and Knoop hardnesses between 300 kg/cm$^2$ and 650 kg/cm$^2$. Accordingly, each of the first through twenty-sixth samples 1 to 26 has a knoop hardness higher than that of the third comparative sample 29 and facilitates grinding or polishing as compared with the third comparative sample 29 on machining the first through twenty-sixth samples 1 to 26 into optical lenses or the like.

Referring back to the FIGURE of the drawing, the twenty-fourth through twenty-sixth samples 24 to 26 have internal transmittance versus wavelength characteristics as shown at curves 36, 37, and 38, respectively. According to the inventor's experimental studies, it has been found out that the twenty-third sample 23 also has a characteristic similar to the twenty-fourth sample 24. Measurement of the internal transmittance is carried out for each sample which has a thickness of 10 mm, as in the first and second comparative samples.

As shown in the FIGURE of the drawing, the optical glass according to this invention exhibits a high internal transmittance in comparison with the conventional optical glass. Specifically, a cut-off wavelength according to this invention is shorter than conventional glass. This means that the degree of coloration is improved, basically, at a short wavelength.

Preferably, the optical glass according to this invention may comprise, by weight, 20–75% of $TeO_2$, 0–25% of $B_2O_3$, 0–12% of $GeO_2$, 6–30% of $La_2O_3$, 0–15% of $Y_2O_3$, 0–18% of $Gd_2O_3$, 0–12% of $Yb_2O_3$, 0–18% of $Ta_2O_5$, 0–22% and $Nb_2O_5$, 0–6% of $HfO_2$, and 0–25% of ZnO. In this case, the sum of $B_2O_3$ and $GeO_2$, the sum of $La_2O_3$, $Y_2O_3$, $Gd_2O_3$, and $Yb_2O_3$, and the sum of $Ta_2O_5$ and $Nb_2O_5$ may be between 1% and 25%, between 6% and 35%, and between 2% and 22%, respectively. In addition, the amounts of $Al_2O_3$, $Bi_2O_3$, PbO, $TiO_2$, and $WO_3$ are restricted to ranges between 0% and 10%, between 0% and 10%, between 0% and 30%, between 0% and 10%, and between 0% and 20%, respectively.

Finally, it is possible to apply optical glass according to this invention to a pickup optical system for a compact disk, a laser disk, and the like.

What is claimed is:

1. Optical glass consisting essentially of, by weight, 10–80% of $TeO_2$, 7.9–30% of $B_2O_3$, 0–22% of $GeO_2$, 5–35% of $La_2O_3$, 0–18% of $Y_2O_3$, 0–25% of $Gd_2O_3$, 0–15% of $Yb_2O_3$, 0–20% of $Ta_2O_5$, and 0–26% of $Nb_2O_5$, a first sum of $B_2O_3$ and $GeO_2$, a second sum of $La_2O_3$, $Y_2O_3$, $Gd_2O_3$, and $Yb_2O_3$, and a third sum of $Ta_2O_5$ and $Nb_2O_5$ being between 7.9% and 30%, between 5% and 50%, and between 1% and 26%, respectively.

2. Optical glass as claimed in claim 1, further comprising, by weight, 0–6% of $ZrO_2$, 0–10% of $HfO_2$, and 0–30% of ZnO.

3. Optical glass as claimed in claim 1, further comprising, by weight, 0–20% of BaO, 0–15% of SrO, 0–15%, of CaO, and 0–10% of MgO, a sum of BaO, SrO, CaO, and MgO falling within a range between 0% and 20%.

4. Optical glass as claimed in claim 1, further comprising, by weight, 0–6% of a sum of alkali metal oxide selected from the group consisting of $Li_2O$, $Na_2O$, and $K_2O$.

5. Optical glass as claimed in claim 1, further comprising, by weight, 0–15% of $SiO_2$, 0–12% of $Al_2O_3$, 0–10% of $Sb_2O_3$, and 0–10% of $In_2O_3$.

6. Optical glass as claimed in claim 1, further comprising, by weight, 0–15% of $Bi_2O_3$, 0–35% of PbO, 0–10% of $TiO_2$, and 0–25% of $WO_3$.

7. Optical glass consisting essentially of, by weight, 20–75% of $TeO_2$, 7.9–30% of $B_2O_3$, 0–12% of $GeO_2$, 6–30% of $La_2O_3$, 0–15% of $Y_2O_3$, 0–18% of $Gd_2O_3$, 0–12% of $Yb_2O_3$, 0–18% of $Ta_2O_5$, 0–22% of $Nb_2O_5$, 0–6% of $ZrO_2$, 0–6% of $HfO_2$, and 0–25% of ZnO, a first sum of $B_2O_3$ and $GeO_2$, a second sum of $La_2O_3$, $Y_2O_3$, $Gd_2O_3$, and $Yb_2O_3$, and a third sum of $Ta_2O_5$ and $Nb_2O_5$ being between 7.9 and 30%, between 6% and 35%, and between 2% and 22%, respectively.

8. Optical glass as claimed in claim 1, wherein said first sum of $B_2O_3$ and $GeO_2$ is between 7.9% and 25%.

9. Optical glass as claimed in claim 7, wherein said first sum of $B_2O_3$ and $GeO_2$ is between 7.9% and 25%.

* * * * *